P. S. White,
Hat
No. 109,566.                         Patented Nov. 22, 1870.
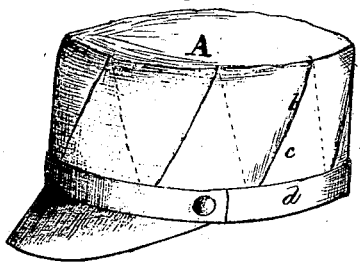
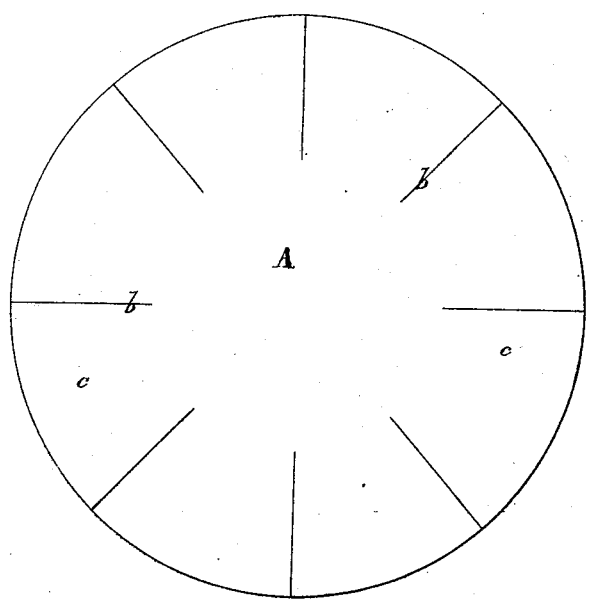
Witnesses, Edward G. Ames                Philo S. White Inventor.

P. S. White,
Hat
No. 109,566.    Patented Nov. 22, 1870.
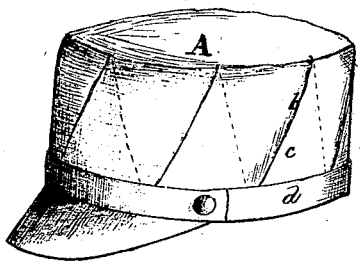
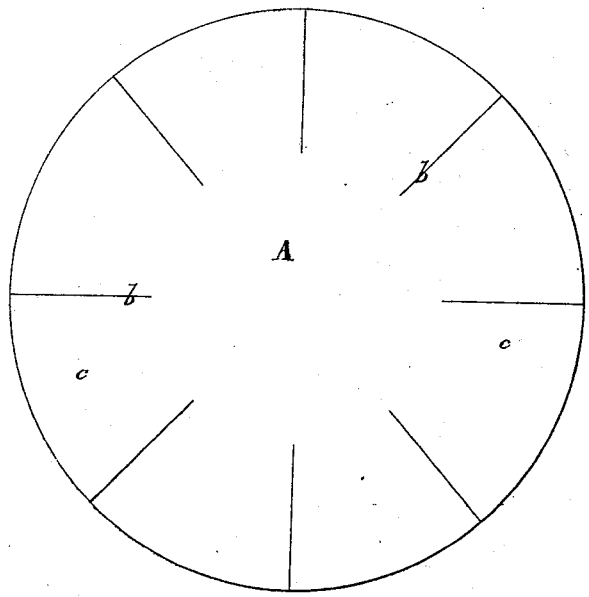
Witnesses, Edward C. Ames    Philo S. White, Inventor.